(12) United States Patent
Ham

(10) Patent No.: US 7,291,218 B2
(45) Date of Patent: *Nov. 6, 2007

(54) METHOD OF FABRICATING ORIENTATION FILM FOR LIQUID CRYSTAL DISPLAY DEVICE

(75) Inventor: Yong-Sung Ham, Gyeonggido (KR)

(73) Assignee: LG. Philips LCD Co., Ltd., Seoul (KR)

( * ) Notice: Subject to any disclaimer, the term of this patent is extended or adjusted under 35 U.S.C. 154(b) by 143 days.

This patent is subject to a terminal disclaimer.

(21) Appl. No.: 11/113,760

(22) Filed: Apr. 25, 2005

(65) Prior Publication Data

US 2005/0252440 A1 Nov. 17, 2005

(30) Foreign Application Priority Data

Apr. 26, 2004 (KR) .................. 10-2004-0028572

(51) Int. Cl.
*C30B 25/12* (2006.01)
(52) U.S. Cl. .................. 117/4; 117/92; 117/95; 117/103
(58) Field of Classification Search .......... 117/4, 117/84, 91, 92, 95, 100, 101, 103
See application file for complete search history.

(56) References Cited

U.S. PATENT DOCUMENTS 5,770,826 A 6/1998 Chaudhari et al.

FOREIGN PATENT DOCUMENTS

KR 10-1999-0057123 7/1999

OTHER PUBLICATIONS

Office Action dated Dec. 14, 2005 for corresponding Korean Application No. 10-2004-0028572.

*Primary Examiner*—Felisa Hiteshew
(74) *Attorney, Agent, or Firm*—Brinks Hofer Gilson & Lione

(57) ABSTRACT

A method of fabricating an orientation film for a liquid crystal display device is provided. An orientation film is formed on a substrate. An ion-beam irradiation apparatus having an ion generation element is provided. The substrate is placed on a stage in a vacuum chamber. The angle of the substrate is controlled such that the orientation film has a predetermined angle with respect to an ion beam of the ion-beam irradiation apparatus. An ion beam from the ion-beam irradiation apparatus irradiates a surface of the orientation film. The ion beam has an energy intensity of about 300 eV to about 800 eV and a predetermined dose.

29 Claims, 9 Drawing Sheets

METHOD OF FABRICATING ORIENTATION FILM FOR LIQUID CRYSTAL DISPLAY DEVICE

PRIORITY CLAIM

This application claims the benefit of Korean Patent Application No. 2004-0028572, filed on Apr. 26, 2004, which is hereby incorporated by reference.

FIELD OF THE INVENTION

The present invention relates to a liquid crystal display (LCD) device, and more particularly, to a method of fabricating an orientation film for an LCD device.

DISCUSSION OF THE RELATED ART

Generally, an LCD device uses optical and electrical anisotropy of a liquid crystal to display an image. Specifically, when a voltage is applied to the LCD device, the arrangement of the molecules of the liquid crystal is changed in accordance with the intensity of the applied electric field. The LCD device displays an image by controlling light dependent upon the molecular arrangement in the liquid crystal. The LCD device includes upper and lower substrates and a liquid crystal layer interposed between the upper and lower substrates.

Hereinafter, it will be explained about the LCD device referring to FIG. 1.

FIG. 1 is a schematic view showing an LCD device according to the related art.

An LCD device 11 includes an upper substrate 5, a lower substrate 10 facing the upper substrate 5 and a liquid crystal layer 9 interposed between the upper and lower substrates 5 and 10. A color filter layer 7 and a black matrix 6 in a periphery region of the color filter layer 7 are formed on the upper substrate 5, and a common electrode 18 is formed on the color filter layer 7 and the black matrix 6. A gate line 14, a data line 22 crossing the gate line 14 to define a pixel region P, a thin film transistor T near a crossing of the gate and data lines 14 and 22, and a pixel electrode 36 connected to the thin film transistor T and disposed in the pixel region P are formed on the lower substrate 10. Although not shown, the upper substrate 5 also includes the same pixel region P as the lower substrate 10. Generally, the upper and lower substrates 5 and 10 may be referred as color filter and array substrates, respectively.

The array substrate is fabricated by forming the gate and data lines, the switching element, and the pixel electrode by deposition, photolithography and etching a conductive material. Further, gate and data pads are formed at end portions of the gate and data lines, respectively. The color filter substrate is fabricated by forming the black matrix at a boundary of the pixel region, the color filter layer in the pixel region and a common electrode on the black matrix and the color filter layer. The array and color filter substrates are attached to each other and a liquid crystal layer interposed between the array and color filter substrate, thereby obtaining a complete LCD device.

The LCD device uses an electro-optic effect of the liquid crystal determined by the anisotropy of the liquid crystal itself and a state of the molecular arrangement of the liquid crystal. Specifically, control of the molecular arrangement of the liquid crystal affects the stability of the image display in the LCD. Therefore, an orientation process is performed uniformly to control an initial arrangement of the liquid crystal molecules.

The orientation process includes printing an orientation film on the substrate and treating a surface of the orientation film to form a polymer chain having a defined direction on the orientation film. In printing the orientation film, a polymer such as polyimide of the orientation film is formed on substantially the entire surface of the substrate with a uniform thickness. More specifically, the orientation film is not formed on the entire surface of the substrate, but it is actually formed on a region including the liquid crystal layer, such as an active region that displays an image. For example, the orientation film is formed by spin coating on the entire surface of the substrate, and is then etched to remove a portion of the orientation film corresponding to a non-display region. Therefore, when spin coating is applied to the orientation film formation, a previous patterned transcription plate corresponding to the active region is utilized in order to print the orientation film.

Next, the substrate having the orientation film is maintained in a drying furnace and a hardening furnace for an appropriate time. This removes moisture in the orientation film and permits the film to obtain the appropriate hardness. In addition, a surface treatment of the orientation film is performed in order to form a polymer chain having a defined direction on the surface of the hardened orientation film by rubbing according to the related art.

Hereinafter, the surface treatment method by rubbing will be explained referring to FIGS. 2A and 2B. FIGS. 2A and 2B are schematic views showing a process of a surface treatment for an orientation film according to rubbing of the related art.

In FIGS. 2A and 2B, in order to perform rubbing, a stage 30 movable along a particular direction, a rubbing roll 50 having a rolling bar type, and a rubbing rag 55 covering the rubbing roll 50 are provided. For example, the rubbing rag 55 is made of rayon. The rubbing rag 55 has whiskers 57. Alternately, the rubbing roll 50 may be movable along the particular direction instead of the stage 30. At first, a substrate 40 having an orientation film 45 is disposed on the stage 30, and then the rubbing roll 50 is positioned with a gap for the substrate 40. Simultaneously, the rubbing roll 50 rotates at a high speed. At this time, the whiskers 57 of the rubbing rag 55 contact the surface of the orientation film 45 and are rubbed against the surface of the orientation film 45. Specifically, the polymer chain of the orientation film 45 is arranged along the defined direction by rubbing the surface of the orientation film 45 using the rubbing roll 50 having the rubbing rag 55. For instance, by arranging the polymer chain, the orientation film 45 can be oriented along the defined direction.

However, the surface treatment of the orientation by rubbing according to the related art has several problems as follows.

Because the whiskers 57 extending from the surface of the rubbing rag 55 fall out through the rubbing, particles may be introduced to the surface of the orientation film 45. Further, minute dust from the rubbing rag 55 may be produced, thereby also introducing particulate into various portions of the substrate 40. Therefore, in order to remove the particles and minute dust from the substrate 40, cleaning and drying process are performed later. As a result of these additional cleaning and drying processes, the manufacturing cost increases.

In addition, static electricity occurs on the substrate 40 when the substrate 40 is rubbed using the rubbing rag 55. This causes electrostatic discharge, which may disconnect neighboring lines from each other or damage the switching elements. Moreover, when the length of the rubbing roll 50 is increased to correspond to a large sized LCD device, the amount of vibration increases dramatically due to eccentricity in the rubbing roll 50 and the high speed used during rubbing. Simultaneously, when the rubbing rag 55 and the substrate 40 contact each other, orientation uniformity is decreased because the pressure between the rubbing rag 55 and the substrate 40 is not uniform, instead being dependent upon the position of the substrate 40 due the severe vibration.

SUMMARY

A method of fabricating a uniform orientation film for a liquid crystal display device is presented in which introduction of minute dust or particles is mitigated.

In one embodiment, a method of fabricating an orientation film for a liquid crystal display device includes: providing an ion-beam irradiation apparatus having an ion generator and a vacuum chamber including a stage; disposing a substrate having an orientation film on the stage; evacuating the chamber; controlling an angle of the substrate having the orientation film using one of the ion generator and the stage such that the orientation film has a predetermined angle with respect to an ion beam of the ion-beam irradiation apparatus; and irradiating a surface of the orientation film with ions of the ion beam. The ions have an energy of about 300 eV to about 800 eV. The surface of the orientation film is irradiated with a predetermined dose.

In another embodiment, a method of forming a liquid crystal display includes: positioning a liquid crystal display substrate having an orientation film thereon on a stage in a vacuum chamber; evacuating the chamber; controlling a position of the substrate by adjusting at least one of an ion-beam irradiation apparatus and the stage such that the orientation film has a predetermined angle with respect to an ion beam emitted from the ion-beam irradiation apparatus; and irradiating a surface of the orientation film with ions of the ion beam, with the orientation film at the predetermined angle, in a single pass from one end of the surface to an opposing end of the surface. The ions have enough energy to provide the orientation film with an orientation restriction force sufficient to control an initial alignment of liquid crystal molecules to be applied to the surface.

In either embodiment, the method may include one or more of the following: tilting at least the stage to produce the predetermined angle, moving at least the ion-beam irradiation apparatus to produce the predetermined angle, moving at least the stage to irradiate the surface, the stage movable in a single direction during irradiation of the surface, the stage fixed such that the predetermined angle is not changed when the stage is moved, the energy of the ions is low enough to inhibit a substantial amount of etching of the orientation film during the single pass, attaching another substrate to the substrate having the orientation film after irradiation of the orientation film without cleaning the substrate having the orientation film after irradiation of the orientation film, and/or adding liquid crystal molecules between the substrates after attaching the substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 6A, 7A and 8A show images of the liquid crystal display panel, and FIGS. 6B, 7B and 8B are SEM (scanning electron microscope) images.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or the like parts.

Figure 1:
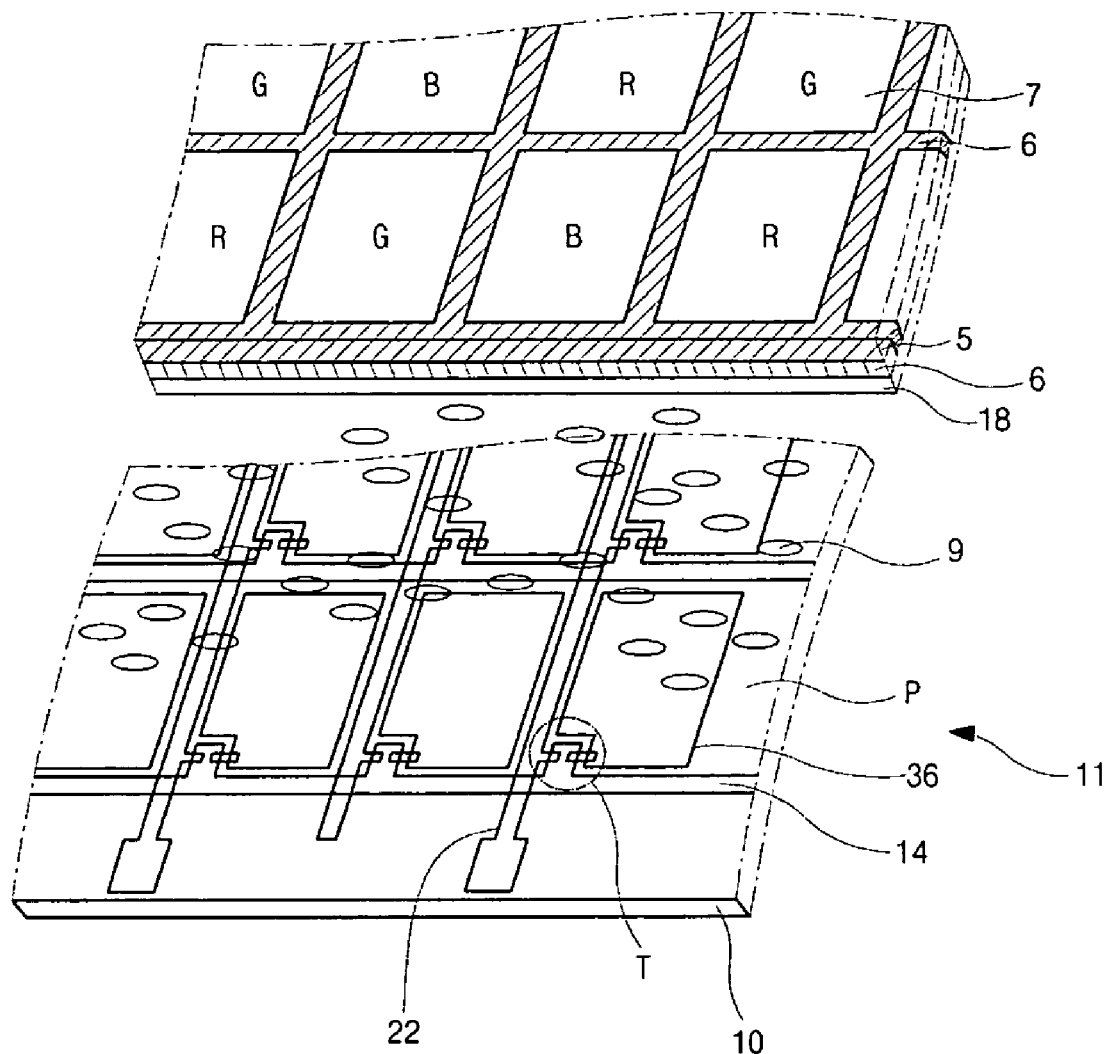
FIG. 1 is a schematic view showing an LCD device according to the related art.
Figure 2A:
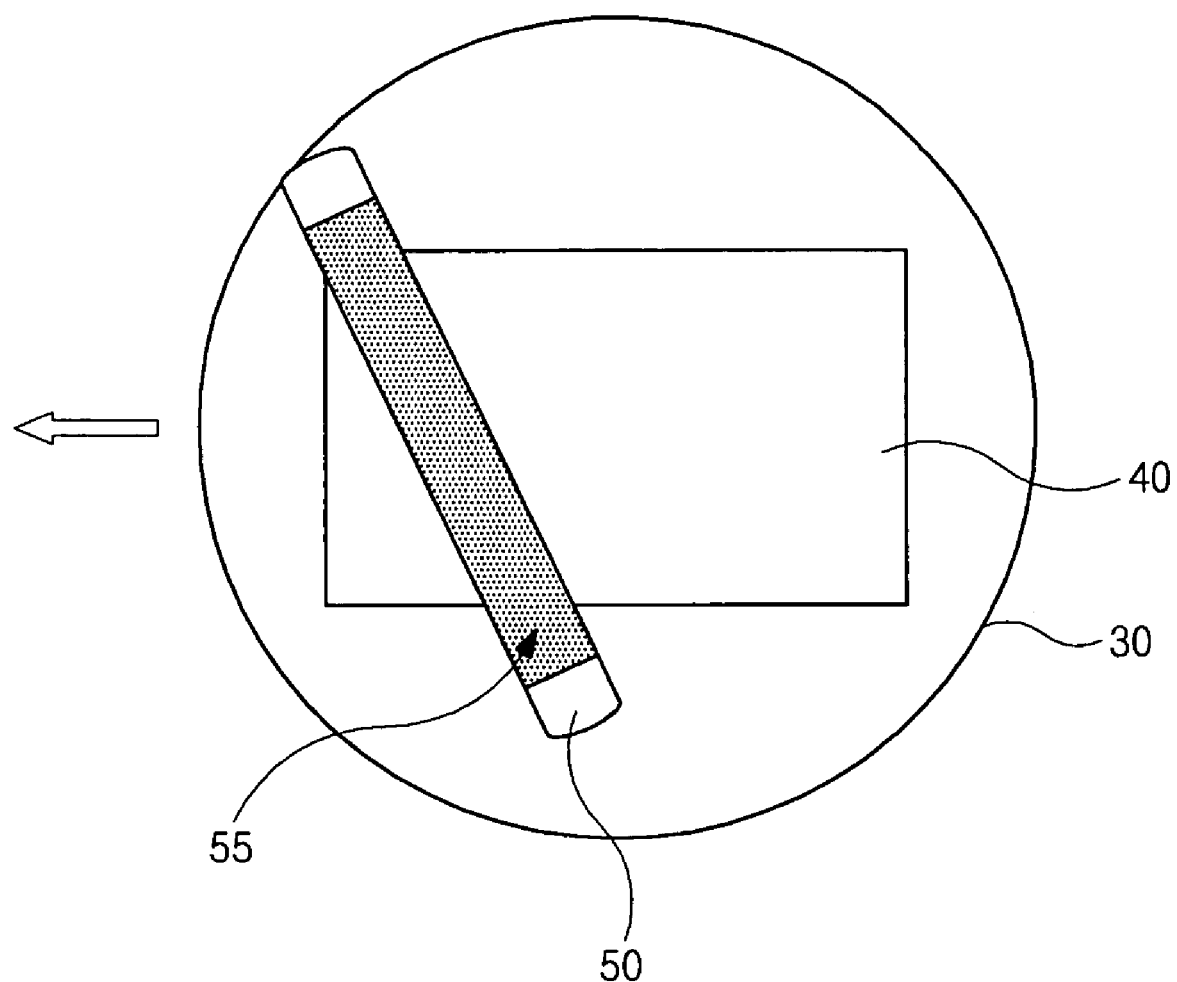
FIGS. 2A and 2B are schematic views showing a process of a surface treatment for an orientation film according to rubbing of the related art.
Figure 2B:
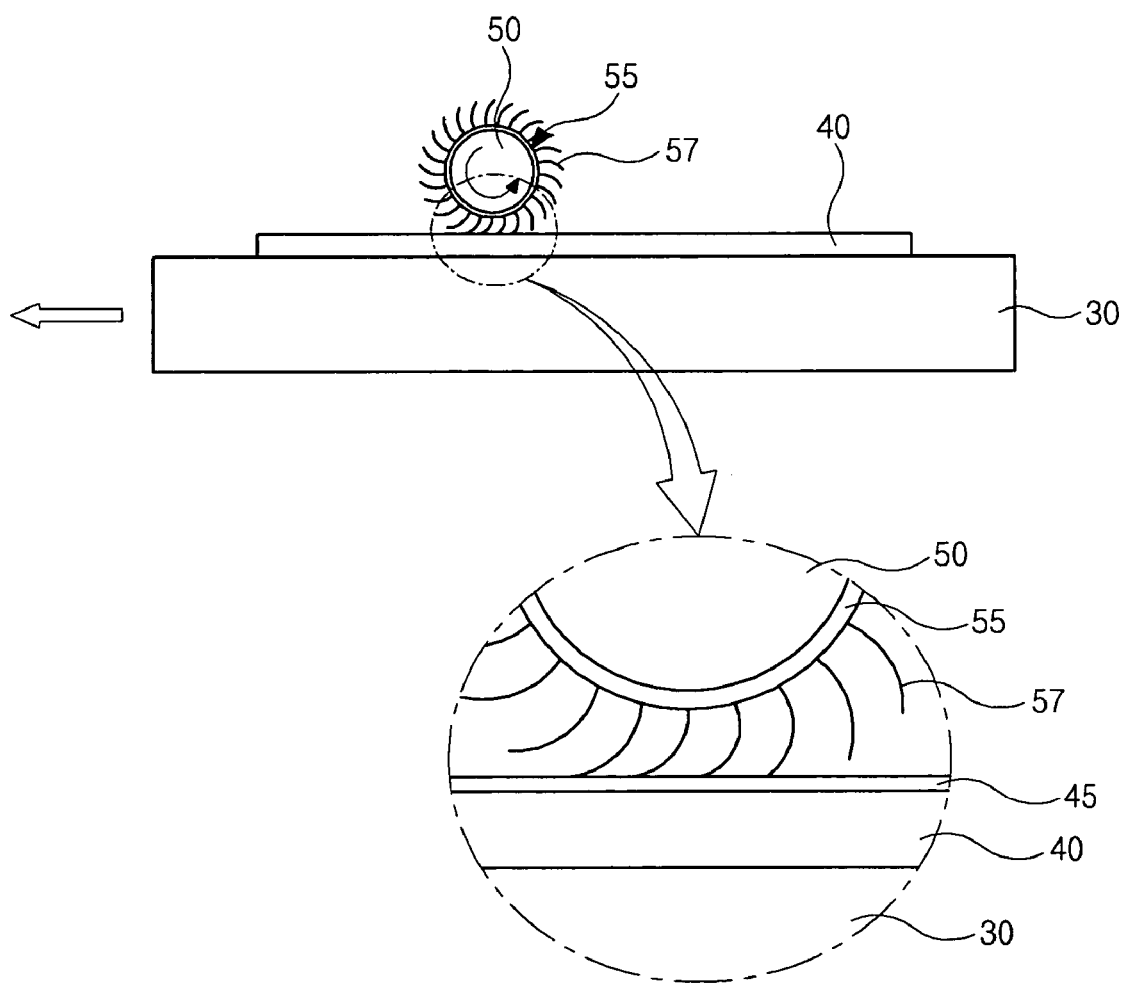
Figure 3A:
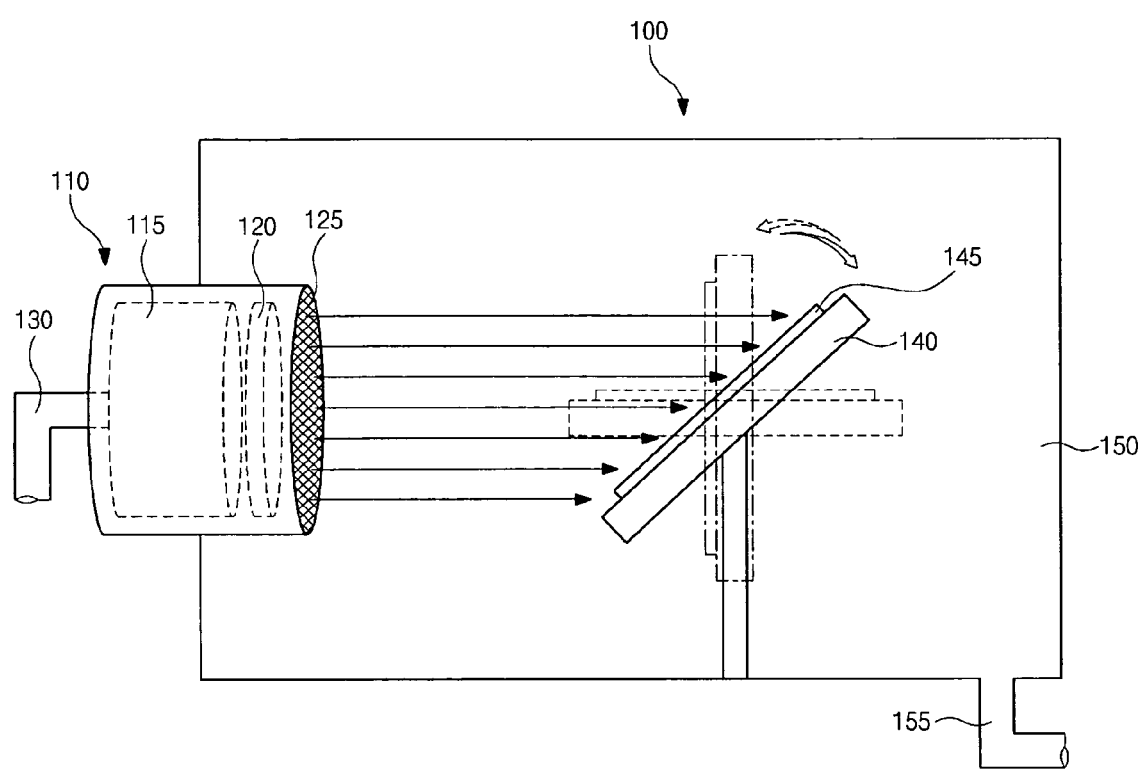
FIGS. 3A and 3B are schematic cross-sectional views showing an ion-beam irradiation apparatus according to a first embodiment of the present invention.
Figure 3B:
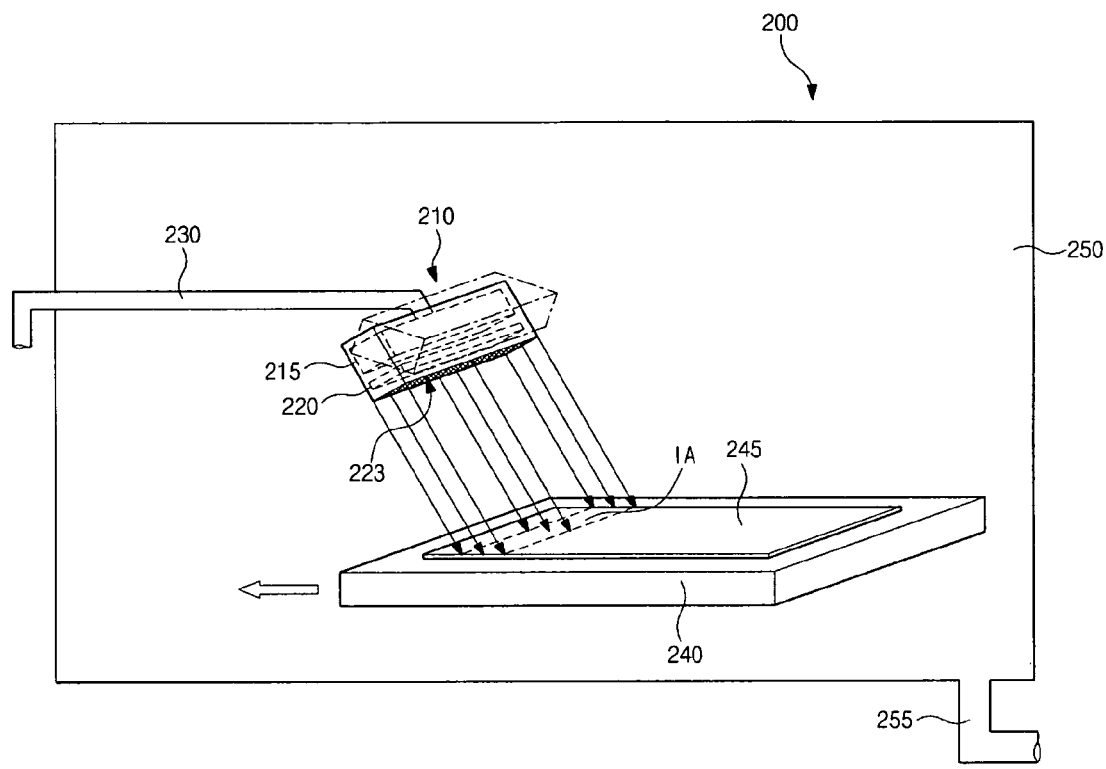

FIGS. 3A and 3B are schematic cross-sectional views showing an ion-beam irradiation apparatus according to a first embodiment of the present invention.

As shown in FIG. 3A, an ion-beam irradiation apparatus 100 includes a vacuum chamber 150, an ion generator 110 in the chamber 150, and a stage 140 to support a substrate 145. The chamber 150 is connected to a vacuum pump (not shown) substantially to form a vacuum, and a vent pipe 155. The ion generator 110 is connected to a gas supply pipe 130 to supply the ion generator 110 with a gas for ion creation. When the ion beam is present in the chamber 150, the pressure in the chamber 150 is about $10^{-5}$ torr to about $10^{-3}$ torr.

The ion generator 110 includes a plasma chamber 115 that ionizes the gas, an accelerating electrode 120 that increases the speed and energy of the ions, and an ion-exhaust port 125 comprising a grid structure. The stage 140 can be rotated so that the ions from the ion generator 110 can irradiate the substrate 145 at a desired angle.

Although not shown, an orientation film is disposed on the substrate 145. The orientation film contains a polymer material with main chains and side chains that diverge from the main chains. The ion-beam irradiation apparatus 100 rearranges the polymer material of the orientation film located on the surface of the orientation film by irradiating the entire surface of the substrate 145 with an ion beam for an appropriate time.

However, when the ion-beam irradiation apparatus 100 is applied to a large size substrate, it is difficult for the entire surface of the substrate 145 to be fully irradiated using a single pass by the ion-beam. FIG. 3B illustrates an ion-beam irradiation apparatus 200 that may be used for a large size substrate.

The ion-beam irradiation apparatus 200 has a chamber 250 similar to the chamber 150 (of FIG. 3A) the first embodiment, a stage 240 that is parallel with the bottom of the chamber 250, and an ion generator 210 from which ions are ejected at a predetermined angle from the bottom of the chamber 250. The ion generator 210 has an ion-exhaust port 223 from which the ions are ejected. The ion-exhaust port 223 has a width equal to or more than a width of the substrate 245. The stage 240 is movable along one direction at a desired speed, thereby permitting the substrate 245 on the stage 240 to be scanned by the ion-beam and the entire orientation film to be irradiated in a single pass. A region of the substrate 245 which the ion beam irradiates is labeled as ion-beam irradiation region IA. As the stage 240 is moved, the ion-beam irradiation region IA is sequentially moved until the entire surface of the substrate 245 is irradiated with ions at the predetermined angle.

The ion generator 210 includes a plasma generator 215, an accelerating electrode 220, and a grid-type ion-exhaust port 223. An inert gas is supplied from outside to the ion generator 210 using a gas port 230. The inert gases include at least one of helium (He), neon (Ne), argon (Ar), krypton (Kr) and xenon (Xe). Ar, for example, may be selected as it is the cheapest gas. Plasma is generated by applying a large electric field in the plasma generator 215 and ionizing the gas. The ions in the plasma generator 215 are provided with a particular energy by the accelerating electrode 220, and ions having the desired energy are ejected into the chamber 250 through the ion-exhaust port 223. As the ions impinge upon the orientation film (not shown) on the substrate 245, the surface of the orientation film is changed. The ions in the chamber 250 are removed to the outside through a vent pipe 255 connected to a vacuum pump (not shown).

The change of the orientation film surface by a surface treatment using the ion-beam irradiation apparatus is now described. In other words, the orientation process of the orientation film by the ion-beam irradiation apparatus is described.

Figure 4A:
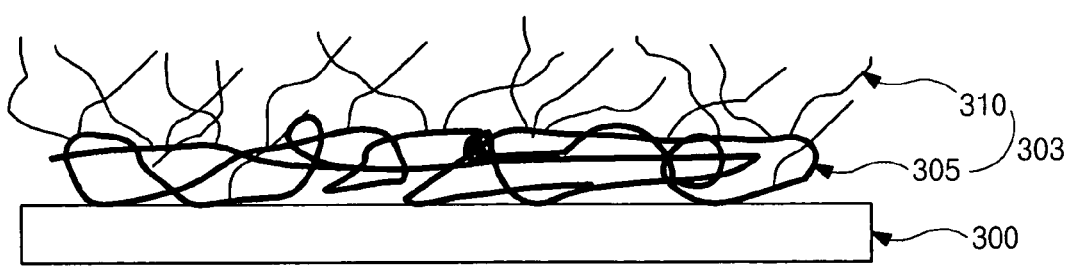
FIGS. 4A and 4B are schematic cross-sectional views showing surface transformation of an orientation film according to an ion-beam irradiation of the present invention.
Figure 4B:
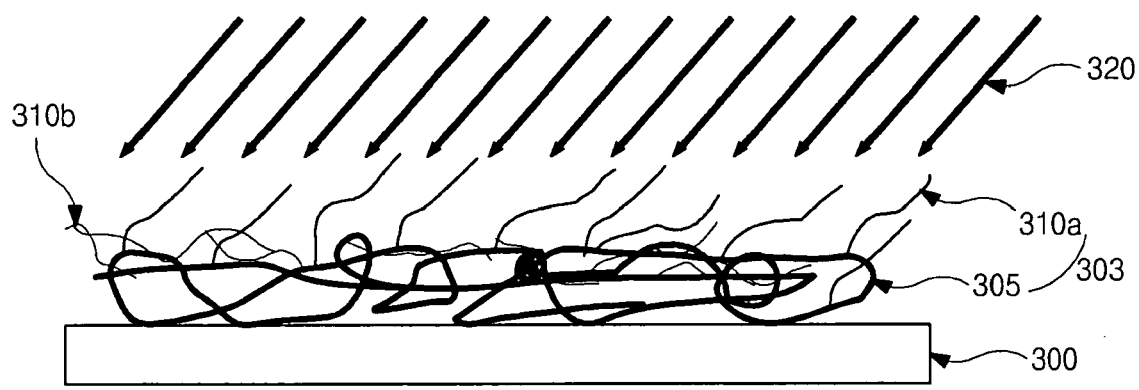

FIGS. 4A and 4B are schematic cross-sectional views showing a surface transformation of an orientation film when exposed to ion-beam irradiation. A surface treatment method of the orientation film using the ion-beam irradiation includes ion-beam irradiation after forming the orientation film on the substrate. In FIG. 4A, an orientation film 303 is formed by printing, drying and curing an inorganic material or a polymer material such as a polymer. For example, the polymer may be polyimide. The orientation film 303 includes main chains 305 that are entangled in a complicated manner and side chains 310 that diverge from the main chains 305 in random directions.

Next, an ion beam (not shown) irradiates a surface 300 that contains the orientation film 303 including the main chains 305 and the side chains 310. As explained above, the inert gases from the ion-beam irradiation apparatus 100 (of FIG. 3A) or 200 (of FIG. 3B) ionize, the resulting ions are provided with a predetermined energy by the accelerating electrode 120 (of FIG. 3A) or 220 (of FIG. 3B) and then are ejected towards the orientation film 303 at the predetermined angle defined by the position of the ion-exhaust port 125 (of FIG. 3A) or 223 (of FIG. 3B) of the ion generator 110 (of FIG. 3A) or 210 (of FIG. 3B) and the stage 140 (of FIG. 3A) or 240 (of FIG. 3B).

In FIG. 4B, the side chains 310a that diverge from the main chains 305 and have a similar angle to the predetermined angle of the irradiating ion beam 320 is maintained. The directionality of the side chains 310b connected to the main chain 305 at a different angle from the predetermined angle is changed by the ions or these side chains 310b are separated from the main chains 305. After irradiation, of the side chains 310a, essentially only side chains 310a parallel with the irradiation direction of the ion beam 320 remain. As a result, the orientation direction of the orientation film 303 depends on the direction of its side chains 310a. The number of the side chains 310a having the predetermined direction and connected to the main chain 305 are fewer than the initial number of all of the side chain 310a of the orientation film 303.

Generally, when the anchoring energy of an orientation film is greater than $10^{-4}$ J/m$^2$, it is not difficult to produce an initial orientation of the liquid crystal later in contact with the orientation film. Anchoring energy is the orientation restriction force in order to produce an initial orientation of a liquid crystal. The anchoring energy of the orientation film 303 can be adjusted to be greater than $10^{-4}$ J/m$^2$ by controlling the energy intensity of the ion beam. Therefore, control of the initial orientation of the liquid crystal is relatively easy.

After orientation of the orientation film 303, cleaning of the orientation film 303 may be omitted. This is different from orienting the orientation film 303 using a rubbing method, which uses cleaning due to production of minute dust or particles during rubbing. In other words, attachment can proceed without cleaning by using ion irradiation to orient the orientation film 303.

Hereinafter, main factors for the orientation of the side chain on the surface of the orientation film by the mentioned ion-beam irradiation will be explained. Generally, three factors determine the orientation direction and stability of the orientation film. The first factor is energy intensity of the ion beam, that is, the energy of the ions in the chamber. The second factor is the angle of irradiation of the ion beam onto the orientation film. As the ion beam is irradiated onto the substrate, the angle between the main chain and the side chain is changed. The pretilt angle is changed by changing the angle between the main chains and the side chains. The pretilt angle is the initial orientation angle of the liquid crystal molecules.

Figure 5:
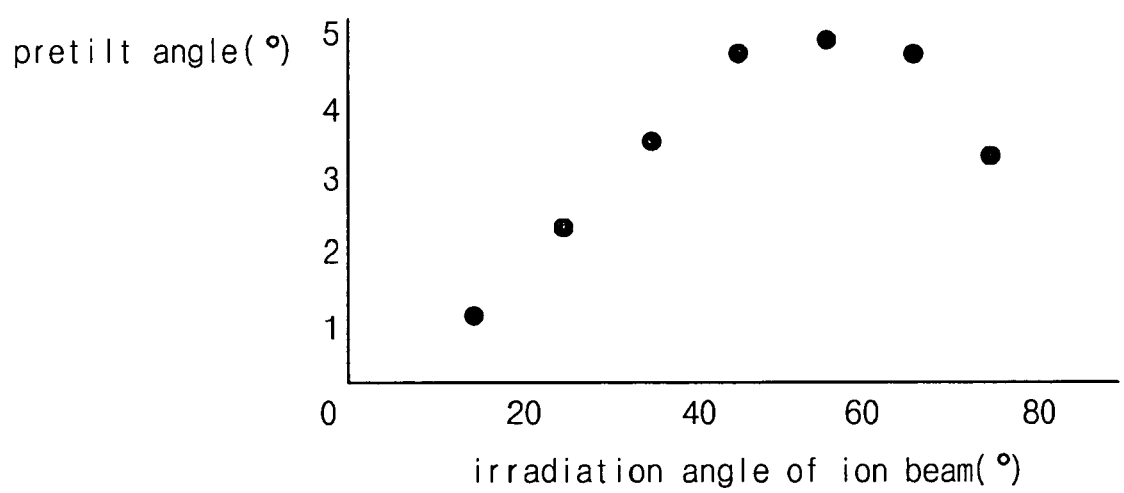
FIG. 5 is a graph showing a pretilt-angle change of a liquid crystal according to an irradiation angle of an ion beam of the present invention.

FIG. 5 is a graph showing the change in the pretilt angle of a liquid crystal as a function of the irradiation angle of the ion beam. As shown in FIG. 5, increasing the angle of the ion beam irradiated onto the orientation film concomitantly increases the pretilt angle of the liquid crystal. As shown, the ion beam produces the maximum pretilt angle when the irradiation angle is 55 degrees to 65 degrees. When the pretilt angle is greater than this, the pretilt angle decreases with increasing irradiation angle. Specifically, the pretilt angle may be controlled between about 0.5 degrees to 5 degrees by adjusting the irradiation angle of the ion beam.

The third factor is irradiation time of the ion beam. The dose of the ion beam is defined as the irradiation time times the density of the ion beam. The third factor is related to the treatment time of the orientation film. For example, ions having a dose of about $5 \times 10^{15}$ N/cm$^2$ to about $5 \times 10^{16}$ N/cm$^2$ may irradiate the orientation film in one embodiment. The angle and dose of the ion beam irradiating the orientation film is predetermined.

The orientation state of the orientation film will now be described in accordance with the energy based on the experiment below. In the experiment, Ar was used for ion formation and a vacuum of about $10^{-5}$ torr to about $10^{-3}$ torr was maintained in the chamber. In addition, the dose was maintained within about $1 \times 10^{16}$ N/cm$^2$. The energy intensity was changed while the irradiation time and the irradiation angle were maintained.

Figure 6A:
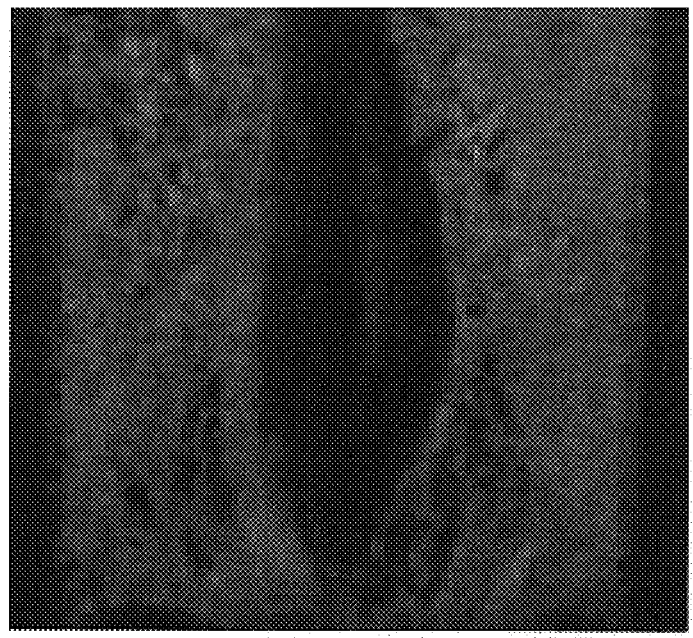
FIGS. 6A and 6B, 7A and 7B, and 8A and 8B show an orientation state according to an energy change of an ion beam of the present invention.
Figure 6B:
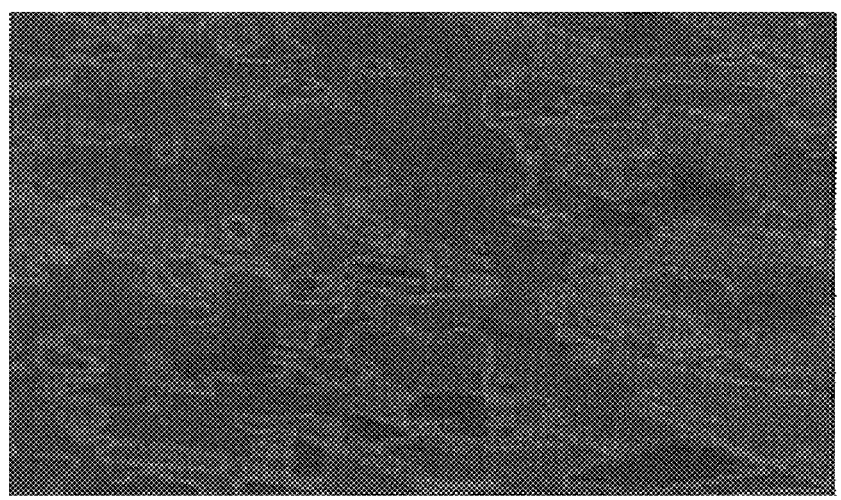
Figure 7A:
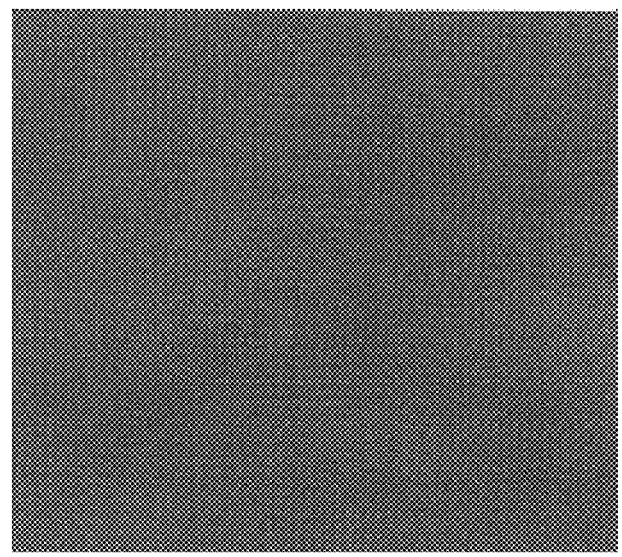
Figure 7B:
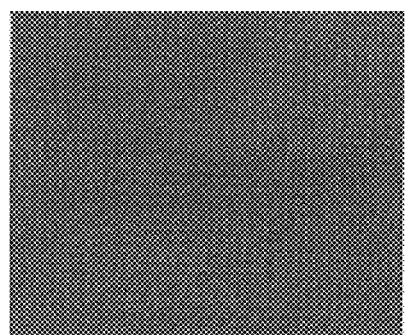
Figure 8A:
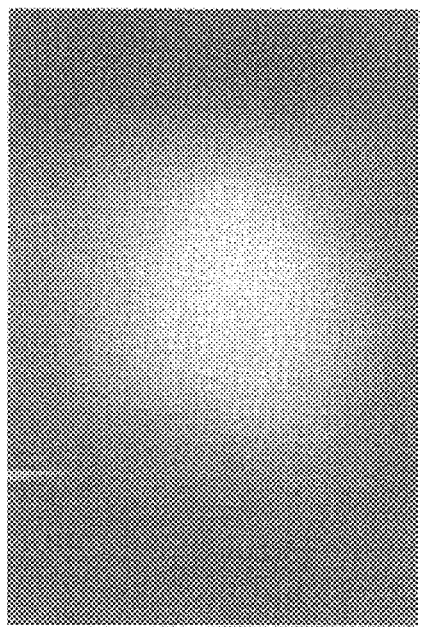
Figure 8B:
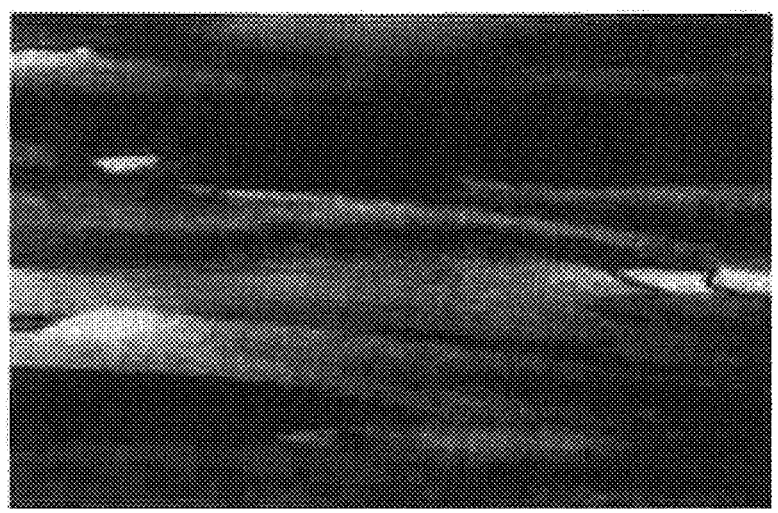

FIGS. 6A and 6B, 7A and 7B, and 8A and 8B are views showing an orientation state as a function of an energy change of the ion beam. FIGS. 6A, 7A and 8A images of the liquid crystal display panel, and FIGS. 6B, 7B and 8B are SEM (scanning electron microscope) images.

FIGS. 6A and 6B show the orientation state of the orientation film after an ion beam having ions with an energy of less than 300 eV has impinged thereon. In this case, the energy of the ions irradiating the surface of the orientation film is too small to overcome the orientation restriction force of later applied liquid crystal molecules. In other words, when the anchoring energy is smaller than $10^{-4}$ J/m$^2$, the liquid crystal molecules are not initially arranged one direction. In this case, spots occur due to rearrangement of the side chains of the orientation film surface during injection of the liquid crystal.

In FIGS. 7A and 7B, show the orientation state of the orientation film after an ion beam having ions with an energy of about 300 eV to about 800 eV has impinged thereon. Accordingly, injected liquid crystal molecules can be uniformly arranged and have a predetermined pretilt angle due to the side chains being arranged along one direction even after injection of the liquid crystal. This enables display of a black state without spots over the entire surface as shown in FIGS. 7A and 7B.

In FIGS. 8A and 8B, show the orientation state of the orientation film after an ion beam having ions with an energy more than 800 eV has impinged thereon. Due to the excessive energy intensity of the ions impinging on the orientation film, both the side chains and the main chains are changed and the orientation film itself is etched.

In FIG. 8A, a central portion of the orientation film is paler than the other portions of the orientation film because the central portion of the orientation film is etched by the ion-beam irradiation. As explained above, because the dose is related to the speed of the orientation process and the angle of the ion-beam irradiation and the orientation stability change the pretilt angle of the liquid crystal, orientation of the orientation film by the ion-beam irradiation according to the embodiments of the present invention is preferably performed by the ion-beam irradiation having of ions with an energy of about 300 eV to about 800 eV.

Using an ion beam having ions with an energy of about 300 eV to about 800 eV, an orientation film having a stable orientation with a high orientation restriction force can be obtained and problems due to static electricity and particulate formed during an orientation process using rubbing can be minimized. In addition, uniform orientation can be achieved for a large size substrate. Furthermore, cleaning after orientation of the orientation film can be omitted because a direct contact type orientation process, causing the formation of minute dust and particles, is not used. Consequently, the manufacturing cost is decreased.

It will be apparent to those skilled in the art that various modifications and variations can be made in the liquid crystal display devices of the present invention without departing from the spirit or scope of the invention. Thus, it is intended that the present invention covers the modifications and variations of this invention provided they come within the scope of the appended claims and their equivalents.

What is claimed is:

1. A method of fabricating an orientation film for a liquid crystal display device, the method comprising:
   providing an ion-beam irradiation apparatus having an ion generator and a vacuum chamber including a stage;
   disposing a substrate having an orientation film on the stage;
   evacuating the chamber;
   controlling an angle of the substrate having the orientation film using one of the ion generator and the stage such that the orientation film has a predetermined angle with respect to an ion beam of the ion-beam irradiation apparatus; and
   irradiating a surface of the orientation film with ions of the ion beam, the ions having an energy of about 300 eV to about 800 eV, the surface of the orientation film being irradiated with a predetermined dose.

2. The method according to claim 1, wherein the vacuum chamber is evacuated to a pressure of about $10^{-5}$ torr to about $10^{-3}$ torr.

3. The method according to claim 1, wherein the predetermined dose is about $5 \times 10^{15}$ N/cm$^2$ to about $5 \times 10^{16}$ N/cm$^2$.

4. The method according to claim 1, wherein the orientation film includes one of an inorganic material and a polymer.

5. The method according to claim 4, wherein the polymer is a polyimide.

6. The method according to claim 4, wherein the orientation film includes a polymer having a plurality of main chains and a plurality of side chains that diverge from the main chains, the plurality of side chains arranged along a particular direction.

7. The method according to claim 1, wherein the ion generation element includes a plasma generator that ionizes a gas.

8. The method according to claim 7, wherein the gas includes one of helium (He), neon (Ne), argon (Ar), krypton (Kr) and xenon (Xe).

9. The method according to claim 1, wherein the ion generation element includes an accelerating electrode that increases the energy of the ions.

10. The method according to claim 1, wherein the ion beam irradiates an entire surface of the substrate in a single pass.

11. The method according to claim 1, wherein irradiating the surface includes defining an irradiation region of the ion beam on the orientation film during irradiation by moving the ion beam along a single direction.

12. The method according to claim 1, wherein the chamber is connected to a vent pipe.

13. The method according to claim 1, wherein the ion generator is connected to a gas supply pipe.

14. The method according to claim 1, wherein the ion generator includes an ion-exhaust port.

15. The method according to claim 14, wherein the ion-exhaust port is a grid type ion-exhaust port.

16. The method according to claim 14, wherein the ion-exhaust port has a width equal to a width of the substrate.

17. The method according to claim 14, wherein the ion-exhaust port has a width larger than a width of the substrate.

18. The method according to claim 1, wherein the stage is movable along a single direction along which the stage progresses to irradiate an entire surface of the orientation film.

19. The method according to claim 1, wherein the orientation film has an orientation restriction force more than about $10^{-4}$ J/m$^2$.

20. The method according to claim 1, further comprising forming the orientation film on the substrate.

21. A method of forming a liquid crystal display, the method comprising:
- positioning a liquid crystal display substrate having an orientation film thereon on a stage in a vacuum chamber;
- evacuating the chamber;
- controlling a position of the substrate by adjusting at least one of an ion-beam irradiation apparatus and the stage such that the orientation film has a predetermined angle with respect to an ion beam emitted from the ion-beam irradiation apparatus; and
- irradiating a surface of the orientation film with ions of the ion beam, with the orientation film at the predetermined angle, in a single pass from one end of the surface to an opposing end of the surface, the ions having enough energy to provide the orientation film with an orientation restriction force sufficient to control an initial alignment of liquid crystal molecules to be applied to the surface.

22. The method according to claim 21, further comprising tilting at least the stage to produce the predetermined angle.

23. The method according to claim 21, further comprising moving at least the ion-beam irradiation apparatus to produce the predetermined angle.

24. The method according to claim 21, further comprising moving at least the stage to irradiate the surface.

25. The method according to claim 21, wherein the stage is movable in a single direction during irradiation of the surface.

26. The method according to claim 25, wherein the stage is fixed such that the predetermined angle is not changed when the stage is moved.

27. The method according to claim 21, wherein the energy of the ions is low enough to inhibit a substantial amount of etching of the orientation film during the single pass.

28. The method according to claim 21, further comprising attaching another substrate to the substrate having the orientation film after irradiation of the orientation film without cleaning the substrate having the orientation film after irradiation of the orientation film.

29. The method according to claim 28, further comprising adding liquid crystal molecules between the substrates after attaching the substrates.

* * * * *